No. 889,067. PATENTED MAY 26, 1908.
P. H. THOMAS.
MERCURY VAPOR APPARATUS.
APPLICATION FILED JAN. 6, 1904.
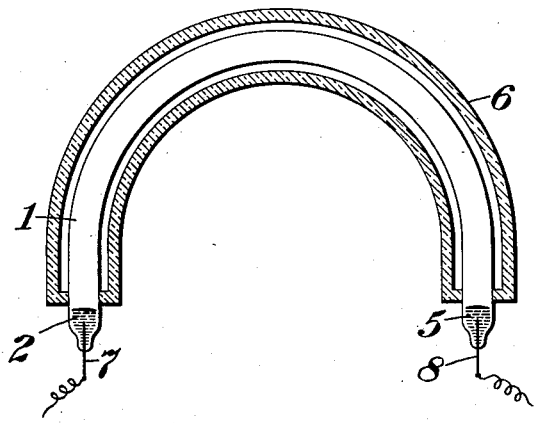
WITNESSES
Chas. F. Clagett
Thos. H. Brown
INVENTOR
Percy H. Thomas.
BY
Charles A. Perry.
ATTORNEY

UNITED STATES PATENT OFFICE.

PERCY H. THOMAS, OF EAST ORANGE, NEW JERSEY, ASSIGNOR TO COOPER HEWITT ELECTRIC COMPANY, OF NEW YORK, N. Y., A CORPORATION OF NEW YORK.

MERCURY-VAPOR APPARATUS.

No. 889,067.　　　　Specification of Letters Patent.　　　　Patented May 26, 1908.

Application filed January 6, 1904. Serial No. 187,891.

*To all whom it may concern:*

Be it known that I, PERCY H. THOMAS, a citizen of the United States, and resident of East Orange, county of Essex, State of New Jersey, have invented certain new and useful Improvements in Mercury-Vapor Apparatus, of which the following is a specification.

It is well-known that silica is pervious to the ultra-violet rays, and it is found that when an electric current is passed between electrodes inside a container of silica, these rays, traversing the silica holder, generate ozone very rapidly. The experiment has been tried with a well-known mercury vapor apparatus, a silica container being substituted for the usual container of such apparatus, and it was found that ozone was generated to such an extent that its effects were too serious to be borne by the operators of the apparatus for any considerable length of time.

The present invention is designed to overcome the difficulties connected with the generation of ozone or other troublesome gases by the passage of current between electrodes inside a silica container, by surrounding the whole apparatus with a screen made of material which is more or less impervious to the ultra-violet rays. Such a screen might be made of ordinary glass, and the simplest embodiment of the invention would consist of a mercury vapor lamp having a container made of silica, the said container being surrounded by a screen of glass. The invention, is, however, equally applicable to any apparatus in which electric current is passed between electrodes or circuit terminals inside a container of silica.

I have chosen to illustrate the invention in connection with a mercury vapor lamp, the drawing showing a vertical section of such a lamp having a container of silica, surrounded by a screen of glass.

In the drawing, 1 is a container of silica, and 2 and 5, respectively, positive and negative electrodes within the container. The electrode 2 may be of iron or any other suitable material and the electrode 5 may be of mercury or other volatilizable material suited for the purpose. Lead-wires, 7 and 8, lead, respectively, to the positive and negative electrodes through the walls of the silica container.

In general, the apparatus thus far described is similar to the well-known mercury vapor lamps, except that the container is made of silica instead of glass.

In order to obviate the difficulties connected with the operation of a lamp such as would be constituted by the devices already described, I surround the said lamp with a screen, 6, of glass, which is impervious to the ultra-violet rays.

I claim as my invention:

1. The combination with a closed holder of silica, electrodes therein, and lead-wires for connection with an external circuit extending to the electrodes, of a screen surrounding the said holder, the said screen being of a material which is substantially impervious to ultra-violet rays.

2. A mercury vapor electric lamp comprising a closed container of silica, a positive and a negative electrode therein, lead-wires for connecting the said electrodes with an external circuit, the said container being surrounded except at the portions traversed by the lead-wires by a screen of material impervious to ultra-violet rays.

3. The combination with a closed holder composed of a material which is pervious to ultra-violet rays, electrodes therein, and lead-wires connecting the said electrodes to an external circuit, of a screen surrounding the said holder, the said screen being of a material which is substantially impervious to ultra-violet rays.

4. In a vapor electric apparatus, the combination of a closed tube pervious to actinic rays, electrodes therein, lead-wires connecting the said electrodes with an external circuit, a screen impervious to actinic rays surrounding the tube, and a conducting vapor within the tube through which current is adapted to pass.

5. In a vapor electric apparatus, the combination of a closed quartz tube, electrodes therein, lead-wires for connecting the said electrodes to an external circuit, a glass tube surrounding the quartz tube, and a conducting vapor within the quartz tube through which the current in the vapor medium is caused to pass.

6. In a vapor electric apparatus, the combination of a closed tube pervious to ultra-violet rays, electrodes therein, lead-wires for connecting the electrodes with an external circuit, a screen impervious to ultra-violet rays surrounding the tube, and a conducting vapor within the tube through which electric current is adapted to pass.

7. The combination with a closed holder of silica, electrodes therein, and lead-wires for connection with an external circuit extending to the electrodes, of a screen surrounding the said holder, the said screen being of a material which is substantially impervious to ultra-violet rays and being so proportioned as to leave a space between the said holder and the said screen.

Signed at New York, in the county of New York, and State of New York, this 16th day of December, A. D. 1903.

PERCY H. THOMAS.

Witnesses:
 WM. H. CAPEL,
 GEORGE H. STOCKBRIDGE.